(12) United States Patent
Neff et al.

(10) Patent No.: US 9,022,069 B2
(45) Date of Patent: May 5, 2015

(54) SOLENOID OPERATED VALVE WITH CONSTANT BLEED PORT

(71) Applicant: MAC Valves, Inc., Wixom, MI (US)

(72) Inventors: Matthew Neff, Birmingham, MI (US); Eric P. Janssen, Howell, MI (US)

(73) Assignee: MAC Valves, Inc., Wixom, MI (US)

( * ) Notice: Subject to any disclaimer, the term of this patent is extended or adjusted under 35 U.S.C. 154(b) by 144 days.

(21) Appl. No.: 13/836,361

(22) Filed: Mar. 15, 2013

(65) Prior Publication Data
US 2014/0261804 A1 Sep. 18, 2014

(51) Int. Cl.
| F17D 1/20 | (2006.01) |
| F16K 31/06 | (2006.01) |
| F16K 39/02 | (2006.01) |
| F16K 11/044 | (2006.01) |

(52) U.S. Cl.
CPC ........... *F16K 31/0686* (2013.01); *F16K 11/044* (2013.01); *F16K 39/022* (2013.01); *F16K 31/0627* (2013.01)

(58) Field of Classification Search
CPC .............. F16K 11/044; F16K 31/0627; F16K 31/0686; F16K 31/0693; F15B 13/0405
USPC .......................... 137/601.14, 601.18, 618.18; 251/129.07, 129.15, 282
See application file for complete search history.

(56) References Cited

U.S. PATENT DOCUMENTS

| 3,033,228 A | 5/1962 | Mohler |
| 3,244,193 A | 4/1966 | Loveless |
| 3,762,443 A | 10/1973 | Sorenson |
| 4,050,477 A | 9/1977 | Acar |
| 4,598,736 A | 7/1986 | Chorkey |
| 4,632,358 A | 12/1986 | Orth et al. |
| 4,679,765 A | 7/1987 | Kramer et al. |
| 4,915,134 A | 4/1990 | Toliusis et al. |
| 5,103,866 A | 4/1992 | Foster |
| 5,641,148 A | 6/1997 | Pena et al. |
| 5,697,342 A | 12/1997 | Anderson et al. |
| 6,328,275 B1 | 12/2001 | Yang et al. |

(Continued)

FOREIGN PATENT DOCUMENTS

GB     2170578 A     8/1986

OTHER PUBLICATIONS

International Search Report for EP14155479.0 mailed Jan. 7, 2014.

(Continued)

*Primary Examiner* — John K Fristoe, Jr.
*Assistant Examiner* — Reinaldo Sanchez-Medina
(74) *Attorney, Agent, or Firm* — Harness, Dickey & Pierce, P.L.C.

(57) ABSTRACT

A pressure balanced solenoid operated valve includes a solenoid portion having a coil. A valve member portion is connected to the solenoid portion. The valve member portion has a body including: first and second valve seats; a first cavity positioned between the first valve seat and a valve outlet port. A valve member slidably disposed in the body has a resilient valve element positioned between the first and second valve seats, the resilient valve element when in direct contact with the first valve seat defining a valve closed position. A bleed port created in the body between the first valve seat and the valve outlet port and opening into the first cavity provides a flow path for a pressurized fluid present at the second valve seat in the valve closed position to continuously flow out through the valve outlet port.

21 Claims, 6 Drawing Sheets

(56) References Cited

U.S. PATENT DOCUMENTS

| | | | |
|---|---|---|---|
| 6,601,821 B2 | 8/2003 | Tyler | |
| 6,668,861 B2 * | 12/2003 | Williams | 137/625.65 |
| 7,210,501 B2 | 5/2007 | Neff et al | |
| 7,717,128 B2 | 5/2010 | Pataki | |
| 2006/0021664 A1 * | 2/2006 | Katsuta et al. | 137/625.65 |
| 2006/0065315 A1 * | 3/2006 | Neff et al. | 137/625.65 |
| 2008/0042090 A1 | 2/2008 | Zweber | |
| 2008/0251748 A1 | 10/2008 | Neff et al. | |
| 2009/0212244 A1 | 8/2009 | Pfaff et al. | |

OTHER PUBLICATIONS

Written Opinion of the International Searching Authority for EP14155479.0 mailed Jan. 7, 2014.

* cited by examiner

SOLENOID OPERATED VALVE WITH CONSTANT BLEED PORT

FIELD

The present disclosure relates to solenoid operated valves.

BACKGROUND

This section provides background information related to the present disclosure which is not necessarily prior art.

Solenoid operated valves are known which provide control of a fluid such as pressurized air in operating additional equipment such as sorters, packaging machines, food processors, and the like. In order to retain the solenoid operated valve in a closed position when the solenoid is de-energized, biasing members such as springs are used. It is also known, for example in U.S. Pat. No. 4,598,736 to Chorkey, that fluid pressure can be balanced within the valve to reduce a solenoid force required to move a valve member between closed and open positions.

Known solenoid operated valve designs including pressure balanced solenoid operated valve designs have drawbacks. Central passageways through the valve member are commonly provided to assist in equalizing pressure as the valve member displaces. In applications where a fluid backpressure is applied to clean the fluid system, moisture and dirt can enter at the valve discharge port, and move through the central passageway to the solenoid assembly which can contaminate the solenoid, resulting in valve sticking, reduced valve power, or delayed operating times.

SUMMARY

This section provides a general summary of the disclosure, and is not a comprehensive disclosure of its full scope or all of its features.

According to several embodiments, a solenoid operated valve having a bleed port providing continuous pressurized fluid bleed flow includes a solenoid portion. A valve member portion is connected to the solenoid portion, the valve member portion having a body including first and second valve seats and an outlet port. A valve member is slidably disposed in the body having a valve element positioned between the first and second valve seats. The valve element when in direct contact with the first valve seat defines a valve closed position. A bleed port is created in the body between the first valve seat and the valve outlet port through which in the valve closed position continuously flows a bleed flow of a pressurized fluid present at a valve body inlet port to the outlet port.

According to further embodiments, a pressure balanced solenoid operated valve includes a solenoid portion having a coil. A valve member portion is connected to the solenoid portion. The valve member portion has a body including: first and second valve seats; a first cavity positioned between the first valve seat and a valve outlet port. A valve member slidably disposed in the body has a resilient valve element positioned between the first and second valve seats. The resilient valve element when in direct contact with the first valve seat defines a valve closed position. A bleed port is created in the body between the first valve seat and the valve outlet port and opens into the first cavity providing a flow path for a pressurized fluid present at the second valve seat in the valve closed position to continuously flow out through the valve outlet port.

According to other embodiments, a pressure balanced solenoid operated valve system includes a solenoid operated valve, including: a solenoid portion having external threads and a valve member portion connected to the solenoid portion. The valve member portion has a body including first and second valve seats and an outlet port. A valve member is slidably disposed in the body having a resilient valve element positioned between the first and second valve seats. The resilient valve member when in direct contact with the first valve seat defines a valve closed position. A bleed port is created in the body between the first valve seat and the valve outlet port through which in the valve closed position continuously flows a bleed flow of a pressurized fluid present at a valve body inlet port to the outlet port. A manifold having at least a partially threaded bore receives the external threads of the solenoid portion to engage the solenoid operated valve to the manifold. A first manifold bore having a bore wall defines one extent of a manifold cavity through which the pressurized fluid flows prior to entering the bleed port.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
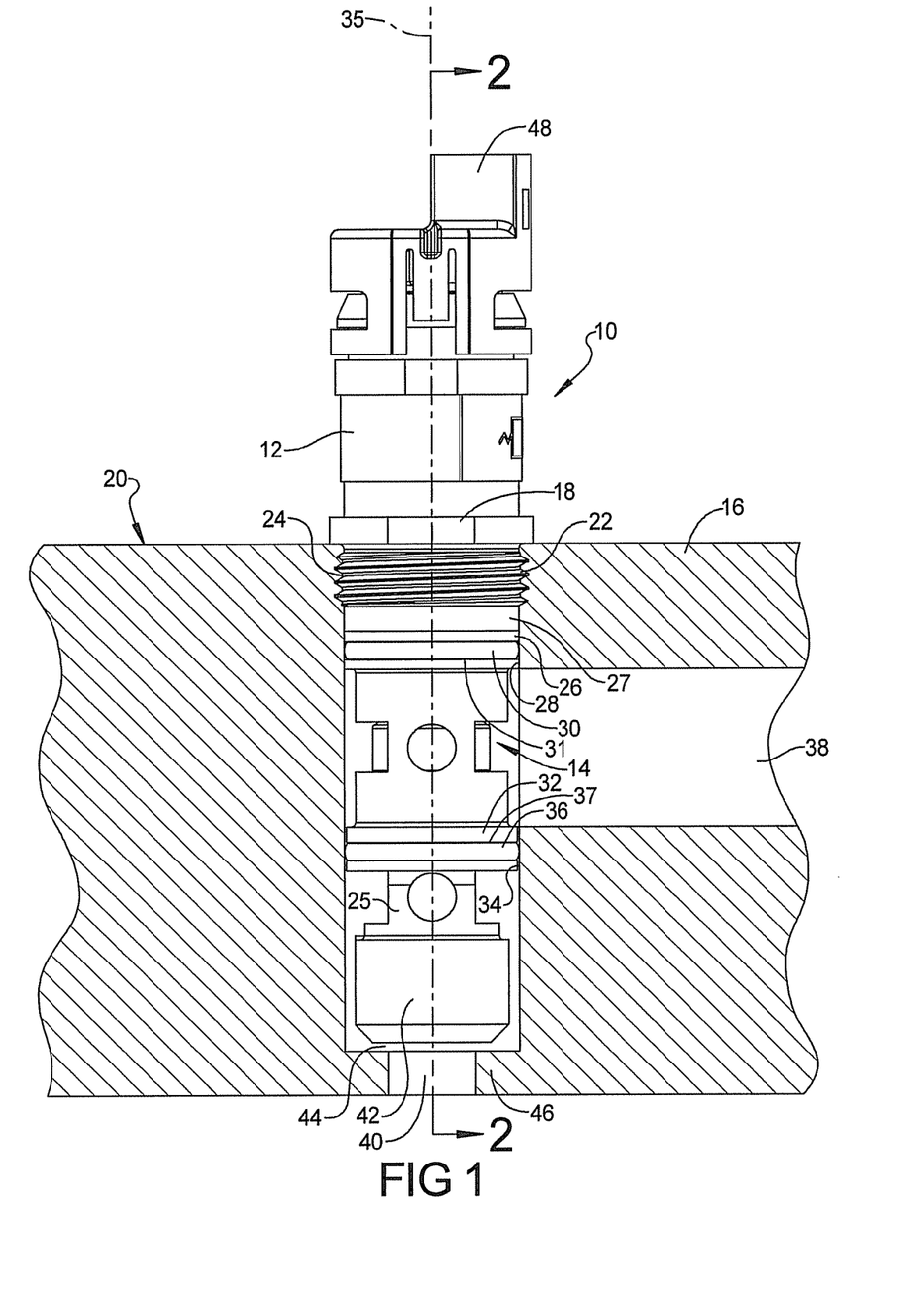
FIG. 1 is a partial cross sectional front elevational view of a solenoid operated valve with a constant bleed port of the present disclosure mounted in a valve manifold.

Referring to FIG. 1, a solenoid valve assembly 10 includes a solenoid portion 12 connected to a valve member portion 14. Solenoid valve assembly 10 is releasably connected to a manifold 16 using an engagement member 18 which can, for example, have multiple faces adapted for contact by a tool, such as a wrench, which permits an axial torque to be applied to solenoid portion 12 to displace engagement member 18 into direct contact with an external outer wall 20 of manifold 16. Solenoid portion 12 includes multiple body threads 22 which are threadably received and engaged with female threads of a partially threaded bore 24 of manifold 16.

Valve member portion 14 includes a body 25 having a first valve member sleeve 26 which abuts solenoid portion 12. Both first valve member sleeve 26 and a further integrally connected un-threaded portion 27 of solenoid portion 12 are received in a first manifold bore 28 created in manifold 16 and co-axially aligned with a bore longitudinal axis 35 of threaded bore 24. A first body seal member 30, such as an O-ring or a D-ring, is received in a circumferential slot 31 of first valve member sleeve 26 and creates a fluid boundary by elastic deflection due to contact with the inner bore wall of first manifold bore 28.

Valve member portion 14 also integrally includes a second valve member sleeve 32 which is slidably received in a second manifold bore 34 of manifold 16. First and second manifold bores 28, 34 are both coaxially aligned with respect to the bore longitudinal axis 35. When received in manifold 16, solenoid valve assembly 10 including both solenoid portion 12 and valve member portion 14 are coaxially aligned with respect to bore longitudinal axis 35. Similar to first valve member sleeve 26, second valve member sleeve 32 also includes a second body seal member 36, such as an O-ring or D-ring, positioned in a seal groove or circumferential slot 37 of second valve member sleeve 32. Second body seal member 36 creates a fluid boundary by elastic deflection due to contact with the inner bore wall of second manifold bore 34 and thereby further creates a fluid boundary between both a fluid supply passage 38 and a fluid discharge passage 40 each created in manifold 16.

Valve member portion 14 further integrally includes a third valve member sleeve 42 defining a free end of valve member portion 14 which is freely received in the second manifold bore 34 of manifold 16. Third valve member sleeve 42 is also coaxially aligned with respect to bore longitudinal axis 35. Third valve member sleeve 42 in the installed position of valve member portion 14 is positioned proximate to but provides a clearance gap 44 between third valve member sleeve 42 and a bore end wall 46 through which fluid discharge passage 40 is created, thereby allowing fluid discharge past third valve member sleeve 42 through fluid discharge passage 40.

Solenoid valve assembly 10 also includes an electrical connection portion 48 extending from solenoid portion 12. Electrical connection portion 48 provides for a power supply connection supplying electrical power to solenoid portion 12. Wiring or a wiring harness (not shown) is commonly connected to electrical connection portion 48 and routed to a power supply (not shown).

Referring to FIG. 2 and again to FIG. 1, valve member portion 14 is releasably threadably engaged to solenoid portion 12 using a plurality of internal body threads 50 of solenoid portion 12 which are threadably engaged by corresponding threads 51 of valve member portion 14, the internal body threads 50 created on a body extension 52 of solenoid portion 12. A valve member 53 is axially slidably disposed in valve member portion 14 and extends partially into solenoid portion 12. In a valve closed position shown, a biasing member 54, such as a compression spring, provides a biasing force continuously acting to bias valve member 53 in a first displacement direction "A". To move valve member 53 to a valve open position, solenoid portion 12 is energized thereby displacing valve member 53 in an opposite second displacement direction "B" which compresses biasing member 54. Compression of biasing member 54 provides stored energy to return valve member 53 in first displacement direction "A" to the valve closed position when solenoid portion 12 is de-energized.

Figure 2:
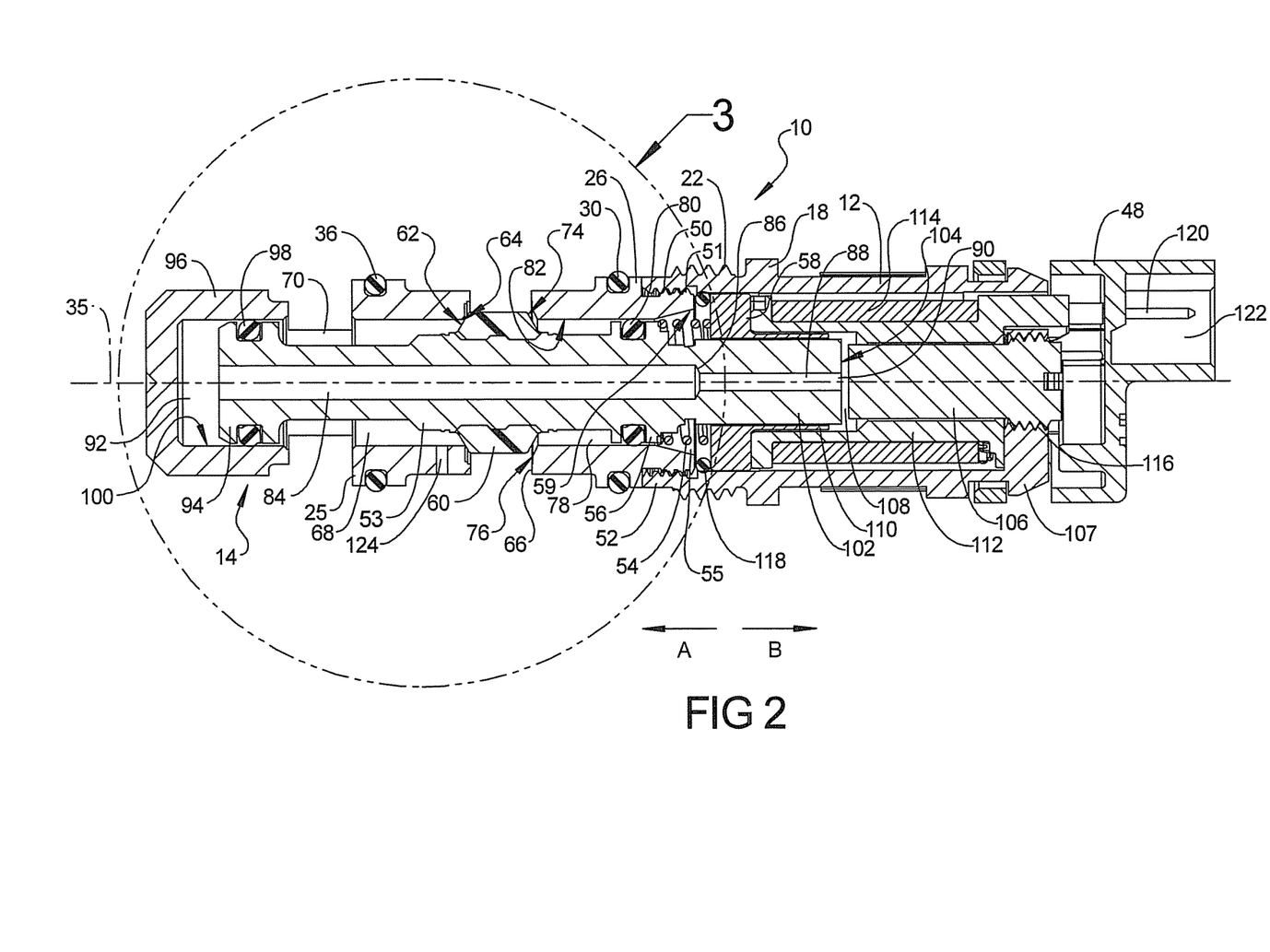
FIG. 2 is a cross sectional side elevational view taken at section 2 of FIG. 1 showing only the valve for clarity.

Biasing member 54 is positioned in a biasing member chamber 55. Biasing member 54 is positioned between each of a shoulder 56 of valve member 53 and a bushing 58 which is slidably received within solenoid portion 12. Biasing member chamber 55 is located proximate to body extension 52 of solenoid portion 12 on an interior facing side 59 of body 25. Bushing 58 also slidably receives and axially guides a portion of valve member 53 during valve member displacement.

Valve member 53 further includes a resilient valve element 60, made for example from an elastically resilient material such as a polymeric material or rubber which is fixed in an over-molding process to an outer diameter of valve member 53. Resilient valve element 60 is shaped during molding or by machining to provide a valve element first side 62. In the valve closed position valve element first side 62 is in direct contact with a circumferential first valve seat 64 of body 25 substantially preventing a pressurized fluid such as air which is present at an inlet port 66 of body 25 from entering a first fluid cavity 68 positioned between first valve seat 64 and a valve outlet port 70. In the valve closed position the pressurized fluid enters body 25 in an open passage 72 created between a valve element second side 74 of resilient valve element 60 and a second valve seat 76. The pressurized fluid at inlet port 66 can thereby enter a second fluid cavity 78 of body 25 which is positioned within body 25 between resilient valve element 60 and the solenoid portion 12. Second fluid cavity 78 is bounded by a valve member first seal member 80, such as an O-ring or a D-ring, positioned between the resilient valve element 60 and the shoulder 56 of the valve member 53 which creates a resilient seal between the valve member 53 and an inner wall 82 of body 25.

In order to quickly equalize the pressure forces acting on valve member 53 to permit valve member 53 to rapidly slide in either of the first or second displacement directions "A" or "B", valve member 53 further includes an axial pressure equalizing passage 84 which is in constant fluid communication via a transition region 86 and a smaller diameter through passage 88 to an opening 90 at the first end of valve member 53. According to several embodiments, pressure equalizing passage 84, transition region 86 and through passage 88 are each coaxially aligned with respect to bore longitudinal axis 35.

Pressure equalizing passage 84 and through passage 88 therefore together extend entirely through valve member 53. At an opposite or second end of pressure equalizing passage 84 with respect to opening 90, pressure equalizing passage 84 opens into a piston chamber 92. Piston chamber 92 slidably receives a piston 94 created at an end of valve member 53. Piston chamber 92 is created within a cylinder head 96 defining a free end of body 25. A valve member second seal member 98, such as an O-ring or D-ring, is provided to create a sliding fluid seal between piston 94 and an inner wall 100 of piston chamber 92 while allowing a sliding motion of piston 94 within piston chamber 92.

A valve member armature portion 102 is also integrally provided with valve member 53, with armature portion 102 defining a first end and piston 94 defining a second end of valve member 53. According to several embodiments, valve member 53, including armature portion 102 and piston 94 are created from a single homogeneous piece of material machined or formed such that no connecting joints are required throughout valve member 53. Armature portion 102 includes a planar end face 104. Armature portion 102 is magnetically drawn toward a retained pole piece 106 when solenoid portion 12 is energized. A gap 108 is normally provided between end face 104 of armature portion 102 and pole piece 106 in the valve closed position to provide the necessary distance allowing valve member 53 to move between the closed and open positions.

With continuing reference to FIGS. 1 and 2, when the solenoid valve assembly 10 is in the valve closed position shown, the substantially contaminant-free pressurized fluid at inlet port 66 enters and pressurizes second fluid cavity 78 which is sealed by first seal member 80. The continuously pressurized condition in second fluid cavity 78 which is at the system pressure provided at the inlet port 66, is isolated from the pressure equalizing passage 84, the biasing member chamber 55 and the solenoid components of solenoid portion 12.

Valve member armature portion 102 is slidably disposed within bushing 58 to help maintain an axial alignment of valve member 53 during its sliding motion in either of the first or second displacement directions "A" or "B". To move valve member 53 away from the valve closed position, electrical energy is provided to solenoid portion 12, creating a magnetic field through pole piece 106 which magnetically acts through and attracts armature portion 102. When the magnetic field is applied through pole piece 106, valve member 53 is magnetically displaced in the second displacement direction "B" until end face 104 of armature portion 102 either contacts or approaches pole piece 106, thereby reducing or closing gap 108. At this time, valve element second side 74 of resilient valve element 60 contacts second valve seat 76 thereby isolating the pressurized fluid at inlet port 66 from second fluid cavity 78. It is anticipated that pressurized fluid will be substantially retained in second fluid cavity 78 which continues to mitigate against contaminants at the valve discharge from reaching the solenoid components.

To further assist in axial displacement of valve member 53, valve member armature portion 102 is slidably received within a bushing sleeve 110 which axially extends from bushing 58. A clearance gap is maintained between bushing sleeve 110 and valve member armature portion 102. Bushing sleeve 110 is slidably received within a coil retainer 112 positioned within solenoid portion 12. Coil retainer 112 provides a coil 114 as a winding of electrical wire which when energized induces the magnetic field through pole piece 106. An axial position of pole piece 106 is adjustable by rotation of pole piece 106 with respect to pole piece threads 116 threadably received in a body head 107 of solenoid portion 12. This axial displacement of pole piece 106 allows the operator to adjust a width of gap 108 to control a closing or opening time of solenoid valve assembly 10, and further to adjust for wear of resilient valve element 60 during the operating life of solenoid valve assembly 10.

An elastic spacer 118 is positioned between bushing 58 and an end of body 25. Elastic spacer 118 is not received in a defined slot or cavity but is freely positioned to act as an elastic rebound member between body 25 and bushing 58. Elastic spacer 118 also provides an additional sealing capability between body 25 and bushing 58 when contacted by both. According to several aspects, at least one connector pin 120 is provided in electrical connection portion 48 to provide electrical energy to coil 114. Connector pin 120 is positioned in a connector cavity 122 which is sized to frictionally receive an electrical connector (not shown) which further insulates connector pin 120 from its ambient environment. When electrical energy is provided through connector pin 120 to coil 114, the magnetic field generated through pole piece 106 attracts valve member armature portion 102 and thereby displaces valve member 53 in the second displacement direction "B", which opens a flow path through valve member portion 14 between inlet port 66 and valve outlet port 70.

It is common during operational use of solenoid valve assembly 10 to back-flush the discharge passage 40 of manifold 16 with a pressurized fluid such as water. This back flushing operation acts to induce contaminants in the manifold 16 to enter the valve outlet port 70 which eventually could migrate toward the solenoid components of solenoid valve assembly 10. In order to further mitigate against contaminants such as oil or particulate matter, which may be in fluid discharge passage 40 of manifold 16, from entering valve outlet port 70, a continuous bleed flow of the pressurized fluid exits valve outlet port 70. The bleed flow is a percentage of a full flow of the pressurized fluid which occurs when the valve member 53 is in the valve open position. Contaminants are therefore precluded from entering fluid cavity 68 and/or pressure equalizing passage 84 and reaching the solenoid components. To provide for the bleed flow, solenoid valve assembly 10 includes a continuously pressurized bleed port 124. During the system back flushing operation, solenoid valve assembly 10 will be in the valve closed position. The substantially clean pressurized fluid at the inlet port 66 of body 25 continuously bleeds into fluid cavity 68 through bleed port 124, and flows out through valve outlet port 70, thereby providing the continuous outward bleed flow of pressurized fluid outward from the valve outlet port 70.

Referring to FIG. 3 and again to FIGS. 1-2, the flow paths of pressurized fluid using the bleed port 124 are as follows. Pressurized fluid at the valve inlet port 66 can freely travel through an open first flow passage 126 created between the valve element second side 74 of resilient valve element 60 and the second valve seat 76 in the valve closed position. Prior to flowing into the bleed port 124, the pressurized fluid flows through a manifold cavity 128 having extents defined by the first and second body seal members 30, 36 in the second manifold bore 34 and further by an inner wall 127 of the second bore 34 of the manifold 16 and by an outer wall 129 of body 25. The bleed port 124 is created through the body 25 of valve member portion 14 in the portion of body 25 located between the first valve seat 64 and the second body seal member 36. A diameter "C" of bleed port 124 is selected to allow a continuous flow of pressurized fluid when the valve member 53 is in the valve closed position. Pressurized fluid enters manifold cavity 128 and subsequently flows inward through the bleed port 124 and into the first fluid cavity 68 formed within valve body 25 between first valve seat 64 and the valve outlet port 70. First fluid cavity 68 is also delimited between the valve member 53 and an inner wall 130 of body 25. The bleed flow of pressurized fluid entering fluid cavity 68 fills and exits valve outlet port 70 in a continuous outward flow direction "D". Contaminants are therefore substantially prevented from entering outlet port 70 by the continuous outlet flow of pressurized fluid in outward flow direction "D", even during the back flush operation.

Figure 3:
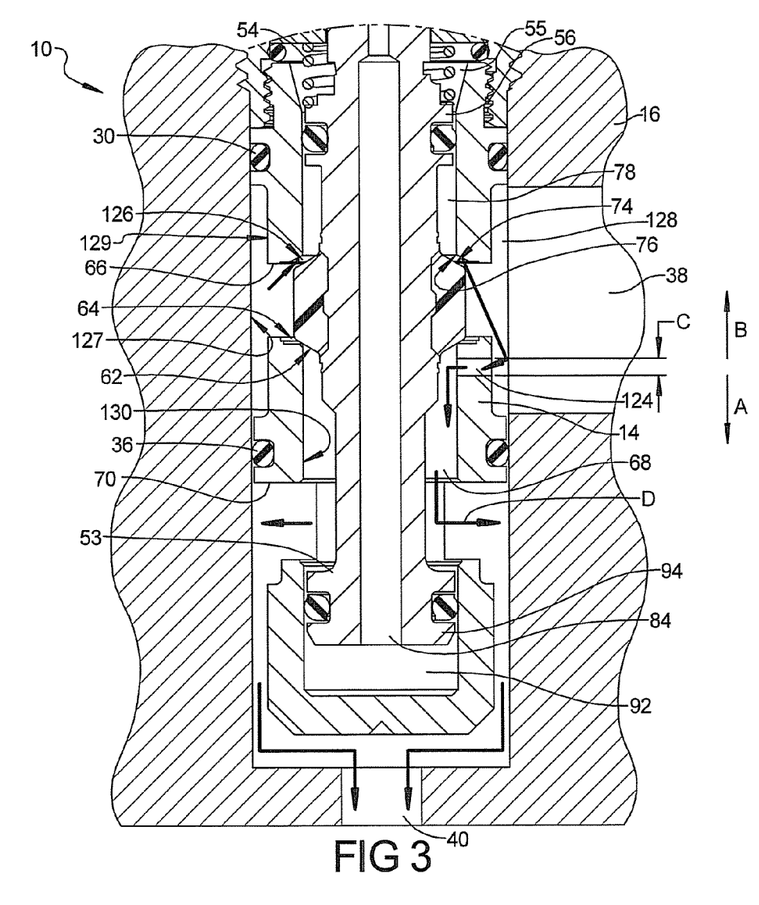
FIG. 3 is a cross sectional front elevational view taken at area 3 of FIG. 2 showing the valve member in a valve closed position.

Referring to FIG. 4 and again to FIGS. 1-3, valve member 53 is shown following displacement in the second displacement direction "B" to a valve open position. As previously described, to displace valve member 53, coil 114 is energized thereby creating a magnetic field through pole piece 106 which magnetically attracts armature portion 102 and thereby valve member 53 toward pole piece 106 in the second displacement direction "B". In the valve open position, valve element second side 74 is in direct contact with second valve seat 76 and an open second flow passage 132 is therefore created between valve element first side 62 and first valve seat 64. Pressurized fluid therefore flows through second flow passage 132 into fluid cavity 68 and out via valve outlet port 70. A flow area "E" of second flow passage 132 is significantly greater than a flow area "F" defined by diameter "C" of the bleed port 124, therefore due to the fluid taking the path of least resistance, little or no flow of pressurized fluid should occur through bleed port 124 when the valve member 53 is in the valve open position.

Figure 4:
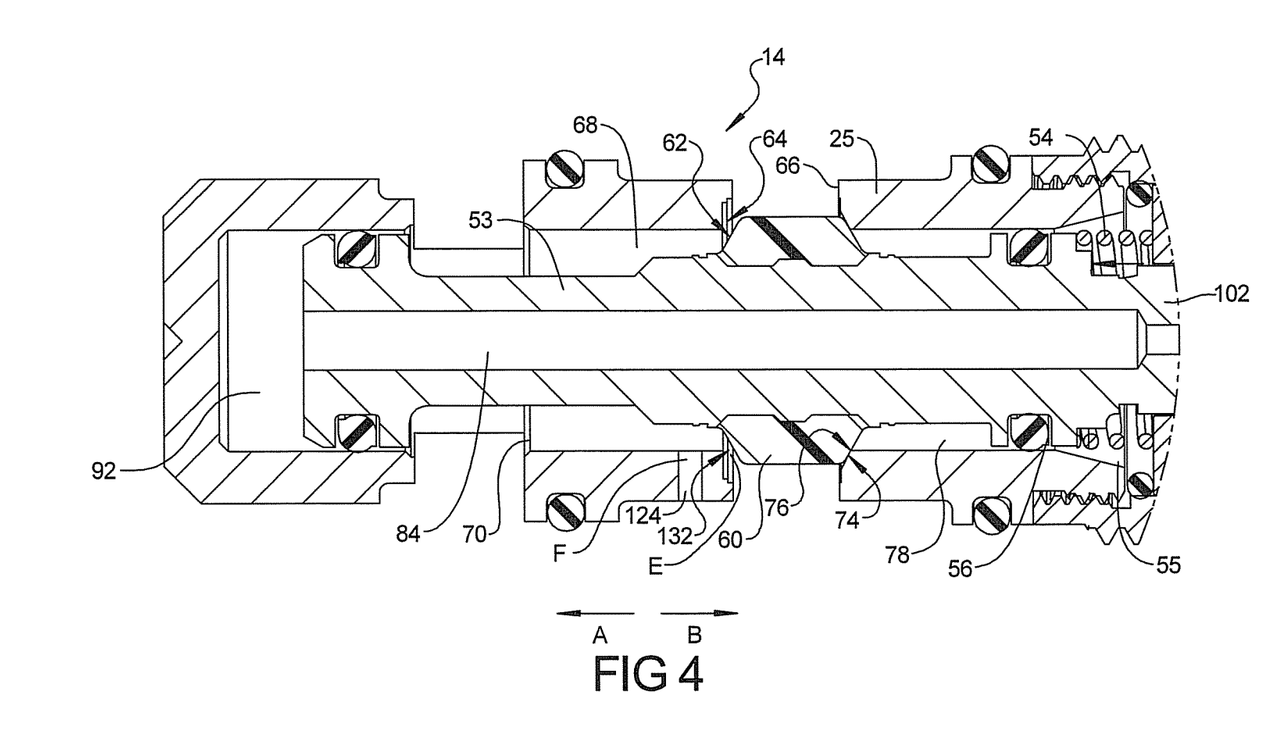
FIG. 4 is a cross sectional front elevational view similar to FIG. 3 further showing the valve member in a valve open position.

The diameter "D" of bleed port 124 can vary between different valve designs to provide greater or lesser bleed flow. Bleed flow will also vary with increasing or decreasing system operation pressure. These features will be predetermined based on parameters such as valve size, fluid controlled by the valve, required valve operating or cycle time, size/operating pressure of the system compressors, and the like. In addition, although air is identified herein as an exemplary pressurized fluid, the valve designs of the present disclosure can also be used for other fluids, including liquid or gaseous states.

Referring to FIG. 5 and again to FIGS. 1-4, according to further aspects, a solenoid valve assembly 134 is modified from solenoid valve assembly 10, therefore only the differences will be further discussed. Solenoid valve assembly 134 includes a valve member portion 136 having a sliding valve member 138 which includes axial pressure equalizing passage 84' which is in constant fluid communication with the piston chamber 92', but is modified to include two side extending passages. A first side extending passage 140 extends normal from pressure equalizing passage 84' and opens into the second fluid cavity 78'. A second side extending passage 142 extends normal from and communicates with pressure equalizing passage 84' and opens into the biasing member chamber 55'. With the valve in the valve closed position, normally pressurized fluid at the inlet port 66' will therefore be present in pressure equalizing passage 84', the piston chamber 92', the biasing member chamber 55' and in gap 108', and therefore will pressurize the solenoid components of solenoid portion 12. The bleed port 124' will function similar to bleed port 124 to provide continuous flow of pressurized fluid out of the outlet port 70'.

Figure 5:
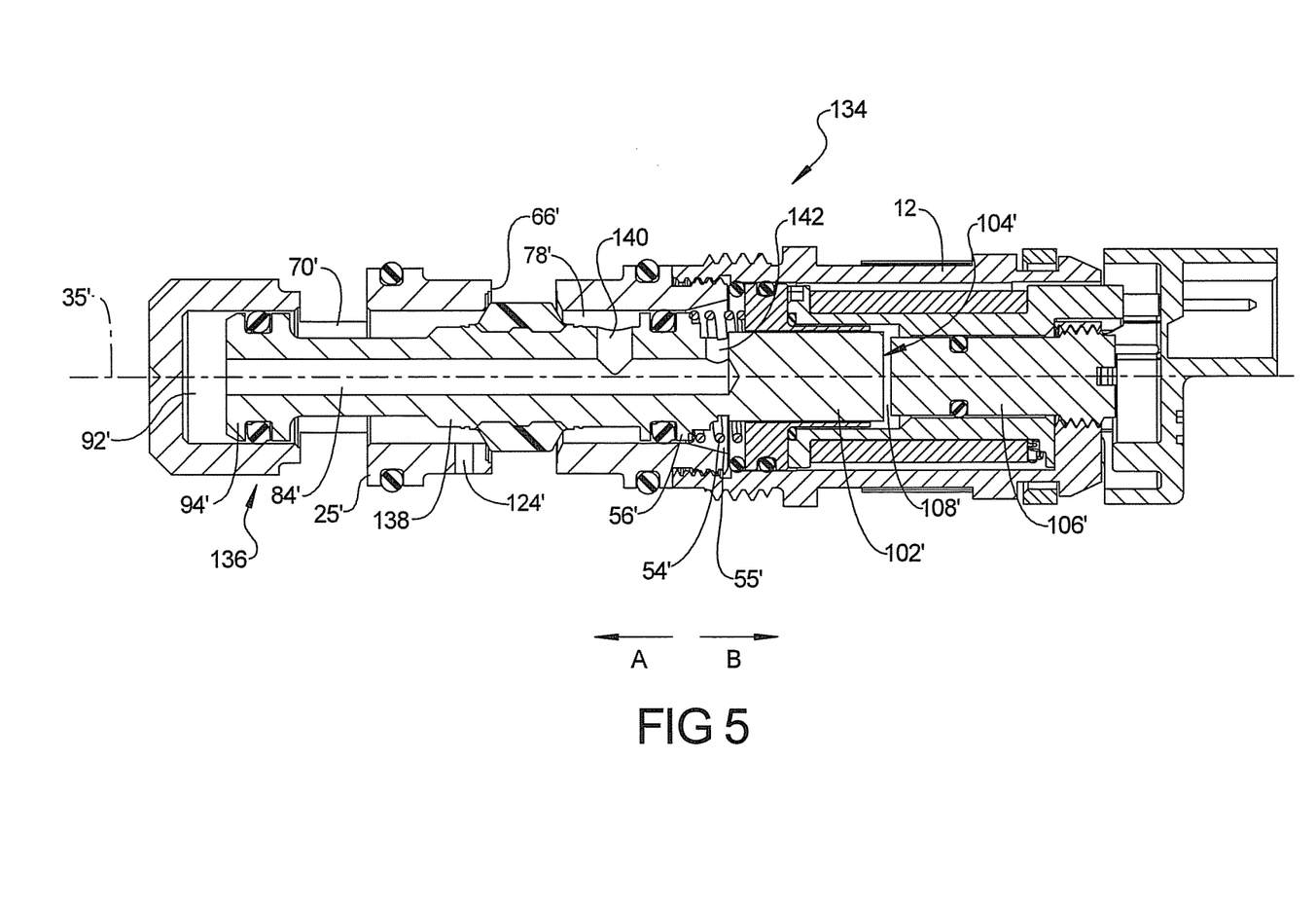
FIG. 5 is a cross sectional side elevational view similar to FIG. 2 of another aspect of a solenoid operated valve with a constant bleed port.
Figure 6:
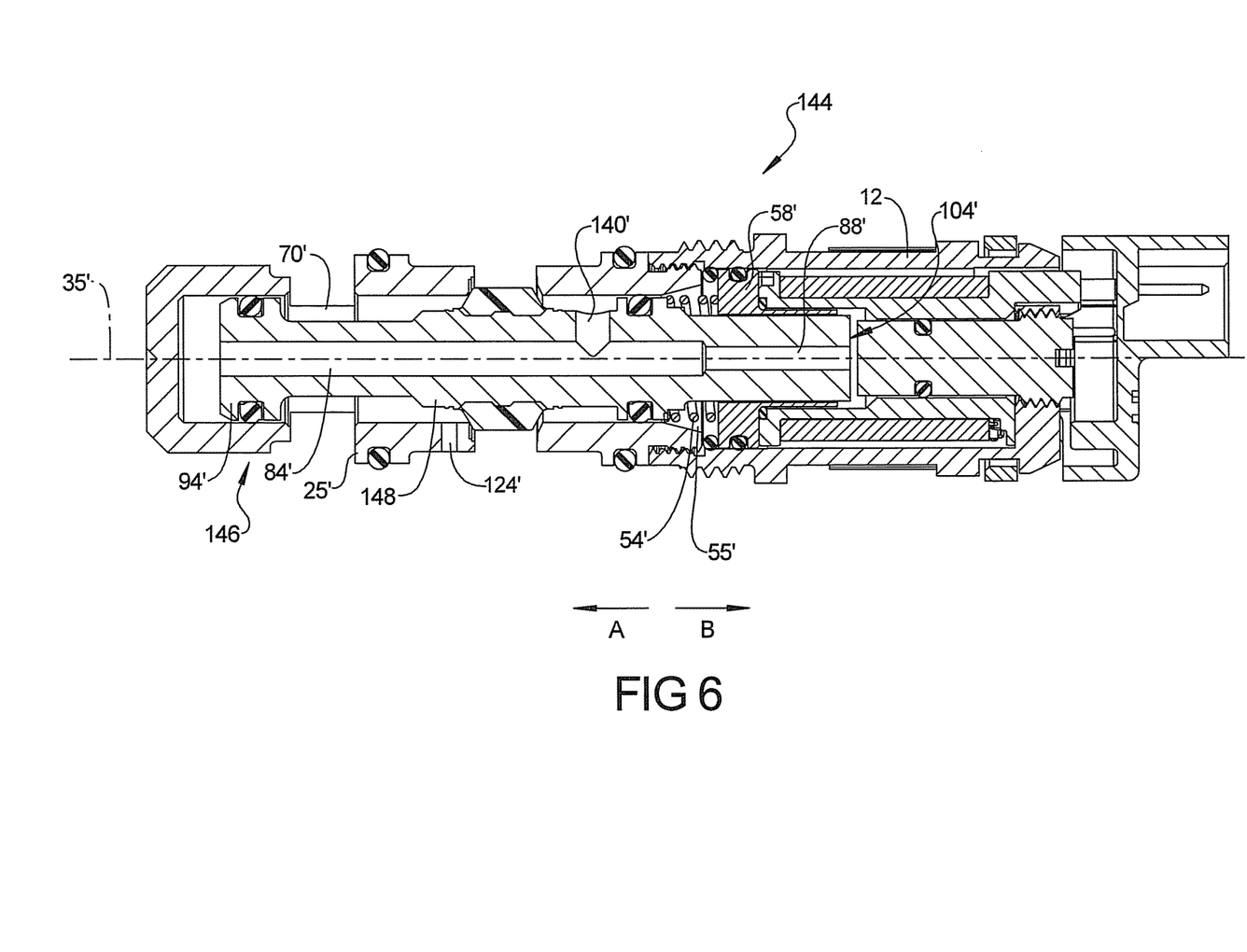
FIG. 6 is a cross sectional side elevational view similar to FIG. 5 of another aspect of a solenoid operated valve with a constant bleed port.

Referring to FIG. 6 and again to FIG. 5, according to further aspects, a solenoid valve assembly 144 is modified from solenoid valve assembly 134, therefore only the differences will be further discussed. Solenoid valve assembly 144 includes a valve member portion 146 having a sliding valve member 148 which includes axial pressure equalizing passage 84' which is in constant fluid communication via transition region 86' and the smaller diameter through passage 88' to the gap 108', but is modified from valve member 138 to include only a single side extending passage. A first side extending passage 140' extends normal from pressure equalizing passage 84' and opens into the fluid cavity 78'. The second side extending passage 142 of solenoid valve assembly 134 is omitted from valve member 148. Pressure equalizing passage 84' directly communicates with the biasing member chamber 55' via the clearance gap maintained between bushing sleeve 110 and valve member armature portion 102 described in reference to FIG. 2. With the valve in the valve closed position, normally pressurized fluid at the inlet port 66' will therefore be present in pressure equalizing passage 84', the piston chamber 92' and in gap 108', and therefore will pressurize the solenoid components of solenoid portion 12. The bleed port 124' will function similar to bleed port 124 to provide continuous flow of pressurized fluid out of the outlet port 70'.

Referring to several aspects, a solenoid operated valve 10 having a bleed port 124 providing continuous pressurized fluid bleed flow further includes solenoid portion 12. Valve member portion 14 is connected to the solenoid portion 12. The valve member portion 14 has a body 25 including first and second valve seats 64, 76 and an outlet port 70. A valve member 53 is slidably disposed in the body 25 having a valve element 60 positioned between the first and second valve seats 64, 76. The valve element 60 when in direct contact with the first valve seat 64 defines a valve closed position. The bleed port 124 is created in the body 25 between the first valve seat 64 and the valve outlet port 70 through which in the valve closed position continuously flows a bleed flow of a pressurized fluid present at a valve body inlet port 66 to the outlet port 70.

According to further embodiments, a pressure balanced solenoid operated valve 10 includes a solenoid portion 12 having a coil 114. A valve member portion 14 is connected to the solenoid portion 12. The valve member portion 14 has a body 25 including: first and second valve seats 64, 76; a first cavity 68 positioned between the first valve seat 64 and a valve outlet port 70. A valve member 53 slidably disposed in the body 25 has a resilient valve element 60 positioned between the first and second valve seats 64, 76. The resilient valve element 60 when in direct contact with the first valve seat 64 defines a valve closed position. A bleed port 124 is created in the body 25 between the first valve seat 64 and the valve outlet port 70 and opens into the first cavity 68 providing a flow path for a pressurized fluid present at the second valve seat 76 in the valve closed position to continuously flow out through the valve outlet port 70.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A solenoid operated valve, comprising:
    a solenoid portion;
    a valve member portion connected to the solenoid portion, the valve member portion having a body including an inlet port, first and second valve seats, an outlet port, and an inner wall defining a valve member receiving cavity;
    a valve member slidably disposed in the body, the valve member having a piston at one end of the valve member that slidingly seals against the inner wall of the body, a shoulder at an opposite end of the valve member that slidingly seals against the inner wall of the body, and a valve element positioned between the piston and the shoulder of the valve member that extends between the first and second valve seats of the body, the valve element defining a valve closed position when positioned in direct contact with the first valve seat, wherein the inlet port and the outlet port extend through the body at locations positioned between the piston and the shoulder of the valve member; and
    a bleed port created in the body between the first valve seat and the outlet port through which in the valve closed position continuously flows a bleed flow of a pressurized fluid that passes along the valve member between the valve element and the piston and to the outlet port to oppose contaminant flow into the solenoid operated valve toward the solenoid portion during a back-flush of the solenoid operated valve.

2. The solenoid operated valve of claim 1, wherein the body includes a first fluid cavity that extends circumferentially about the valve member between the first valve seat and the piston and wherein the first fluid cavity is in fluid communication with the outlet port.

3. The solenoid operated valve of claim 2, wherein the body extends annularly about the valve member and the bleed port extends radially through the body and opens into the first fluid cavity.

4. The solenoid operated valve of claim 2, wherein the body includes a second fluid cavity that extends circumferentially about the valve member between the second valve seat and the shoulder of the valve member and wherein the second cavity is in fluid communication with the outlet port when the valve member is in the valve closed position via a flow path passing between the valve element and the second valve seat and extending through the bleed port and the first fluid cavity to the outlet port.

5. The solenoid operated valve of claim 4, wherein the second fluid cavity is bounded by a valve member first seal member positioned between the shoulder of the valve member and the inner wall of the body that obstructs fluid flow between the second fluid cavity and the solenoid portion.

6. The solenoid operated valve of claim 2, wherein the valve member when oppositely displaced away from the valve closed position by operation of a solenoid coil in the solenoid portion positions the valve element in direct contact with the second valve seat defining a valve open position, the pressurized fluid in the valve open position flowing through a second fluid passage created between the valve element and the first valve seat, the second fluid passage having a flow area larger than a flow area of the bleed port.

7. The solenoid operated valve of claim 6, further including a pressure equalizing passage extending throughout a length of the valve member isolated from the pressurized fluid in both the valve open and closed positions.

8. The solenoid operated valve of claim 7, further including a chamber connecting passage providing fluid communication between the pressure equalizing passage and a biasing member chamber having a biasing member continuously acting to bias the valve member toward the valve closed position.

9. A pressure balanced solenoid operated valve, comprising:
    a solenoid portion having a coil;
    a valve member portion connected to the solenoid portion, the valve member portion having a body including:
        first and second valve seats bounding an inlet port;
        an outlet port that is axially spaced from the inlet port; and
        an inner wall defining a valve member receiving bore;
    a valve member slidably disposed in the valve member receiving bore of the body, the valve member extending between a piston at one end and a shoulder at an opposite end, the valve member having a resilient valve element positioned between the piston and the shoulder of the valve member and the first and second valve seats of the body, the resilient valve element defining a valve closed position when positioned in direct contact with the first valve seat;
    a first cavity created within the valve member portion between the inner wall of the body and the valve member that extends between the resilient valve element and the piston; and
    a bleed port created in the body between the first valve seat and the outlet port that opens into the first cavity and provides a flow path for pressurized fluid when the valve member is in the valve closed position, the flow path extending from the inlet port, through the bleed port, through the first cavity, and to the outlet port.

10. The pressure balanced solenoid operated valve of claim 9, wherein the valve member further includes:

a valve member first seal member positioned between the shoulder of the valve member and the inner wall of the body, the first seal member creating a pressure boundary preventing the pressurized fluid from entering the solenoid portion; and an integrally connected armature portion positioned predominantly in the solenoid portion defining a valve member first end.

11. The pressure balanced solenoid operated valve of claim 10, wherein the valve member further includes: a valve member second seal member positioned between the piston of the valve member and the inner wall of the body, the second seal member creating another pressure boundary adjacent the outlet port.

12. The pressure balanced solenoid operated valve of claim 11, further including:
a piston chamber disposed in the valve member receiving bore adjacent the piston; and
a pole piece disposed at the solenoid portion, wherein a gap is present between the armature portion and the pole piece in a valve open position, the armature portion when the coil is energized being magnetically drawn toward the pole piece decreasing the gap and moving the valve member between the valve closed position and the valve open position having the resilient valve element in direct contact with the second valve seat.

13. The pressure balanced solenoid operated valve of claim 12, further including a pressure equalizing passage extending through the valve member opening into the piston chamber and oppositely into the gap between the armature portion and the pole piece, the pressurized fluid being prevented from entering the pressure equalizing passage by the valve member first and second seal members.

14. The pressure balanced solenoid operated valve of claim 9, wherein a first flow space is created between the resilient valve element and the second valve seat when the valve member is in the valve closed position such that pressurized fluid may flow through the first flow space, into the bleed port, through the first cavity and out through the outlet port when the valve member is in the valve closed position.

15. The pressure balanced solenoid operated valve of claim 9, further including a flow space created between the resilient valve element and the second valve seat when the valve member is in the valve closed position, wherein a flow area of the bleed port is smaller than a flow area of the flow space.

16. A pressure balanced solenoid operated valve system, comprising:
a solenoid operated valve, including:
a solenoid portion having external threads;
a valve member portion connected to the solenoid portion, the valve member portion having a body including an inlet port, first and second valve seats, and an outlet port;
a valve member slidably disposed in the body, the valve member extending between a piston and a shoulder, the valve member having a resilient valve element positioned between the piston and the shoulder and the first and second valve seats, the resilient valve element defining a valve closed position when positioned in direct contact with the first valve seat; and
a bleed port created in the body between the first valve seat and the outlet port through which in the valve closed position continuously flows a bleed flow of a pressurized fluid that passes along the valve member between the resilient valve element and the piston and to the outlet port to oppose contaminant flow into the solenoid operated valve during a back-flush of the solenoid operated valve; and
a manifold having at least a partially threaded bore receiving the external threads of the solenoid portion to engage the solenoid operated valve to the manifold, and a first manifold bore having a bore wall defining one extent of a manifold cavity through which the pressurized fluid flows prior to entering the bleed port.

17. The pressure balanced solenoid operated valve system of claim 16, wherein the body cooperates with the valve member to define:
a first fluid cavity extending annularly about the valve member between the first valve seat and the outlet port; and
a second fluid cavity extending annularly about the valve member between the resilient valve element and the solenoid portion, the outlet port being in fluid communication with the inlet port and the second fluid cavity when the valve member is in the valve closed position.

18. The pressure balanced solenoid operated valve system of claim 16, further including a first body seal member received in a circumferential slot of the valve body creating a fluid boundary by elastic deflection due to contact with an inner bore wall of the first manifold bore.

19. The pressure balanced solenoid operated valve system of claim 18, wherein the valve member portion integrally includes a valve member sleeve which is slidably received in a second manifold bore of the manifold.

20. The pressure balanced solenoid operated valve system of claim 19, wherein the first and second manifold bores are both coaxially aligned with respect to a bore longitudinal axis.

21. The pressure balanced solenoid operated valve system of claim 20, further including a second body seal member positioned in a circumferential slot of the valve member sleeve, the first and second body seal members creating opposite extents of the manifold cavity through which the pressurized fluid flows prior to entering the bleed port.

* * * * *